(12) United States Patent  
McConnell (10) Patent No.: US 6,526,877 B2
(45) Date of Patent: *Mar. 4, 2003

(54) STAGED ROTISSERIE (76) Inventor: James W. McConnell, 12601 Clock Tower Pkwy., Bayonet Point, FL (US) 34667

( * ) Notice: Subject to any disclaimer, the term of this patent is extended or adjusted under 35 U.S.C. 154(b) by 0 days.

This patent is subject to a terminal disclaimer.

(21) Appl. No.: 09/776,372

(22) Filed: Feb. 2, 2001

(65) Prior Publication Data

US 2001/0013276 A1 Aug. 16, 2001

Related U.S. Application Data

(63) Continuation-in-part of application No. 09/432,837, filed on Nov. 1, 1999, now Pat. No. 6,202,545, which is a continuation-in-part of application No. 09/092,787, filed on Jun. 5, 1998, now Pat. No. 5,974,956.

(51) Int. Cl.[7] .................................................. A47J 37/04
(52) U.S. Cl. ..................... 99/421 H; 99/420; 99/443 R
(58) Field of Search ...................... 99/419, 420, 421 H, 99/421 HH, 421 R, 443 C, 443 R (56) References Cited

U.S. PATENT DOCUMENTS

| | | | |
|---|---|---|---|
| 1,996,297 A | 4/1935 | Langenfeld | 99/479 |
| 2,138,813 A | 4/1938 | Bemis | 99/420 |
| 2,142,390 A | 1/1939 | Zerr | 99/420 |
| 2,520,067 A | 8/1950 | Sagen | 99/420 |
| 2,556,808 A | 6/1951 | Harris | |
| 2,655,096 A | 10/1953 | Ebin | 99/420 |
| 3,338,156 A | 8/1967 | Angelos | 99/420 |
| 3,734,740 A | 5/1973 | Zenos | 99/420 |
| 3,747,510 A | 7/1973 | Gladd et al. | 99/443 C |
| 3,848,523 A | 11/1974 | Galisz et al. | 99/421 H |
| 4,034,661 A | 7/1977 | Boosalis et al. | 99/420 X |
| 4,366,182 A | 12/1982 | Kohler | 99/326 X |
| 4,440,071 A | 4/1984 | Boosalis | 99/420 X |
| 4,644,857 A | 2/1987 | Buller-Colthurst | 99/335 |
| 4,760,776 A | 8/1988 | Beidler | 99/421 R |
| 4,882,985 A | 11/1989 | Beller | 99/426 |
| 5,133,447 A | 7/1992 | Florindez | 99/353 X |
| 5,146,842 A | 9/1992 | Romano | 99/421 V |
| 5,197,375 A | 3/1993 | Rosenbrock et al. | 99/328 |
| 5,377,582 A | 1/1995 | Nersesian | 99/420 |
| 5,460,080 A | 10/1995 | Maru, Jr. | 99/420 |
| 5,471,915 A | 12/1995 | Lopata | 99/421 H |
| 5,476,035 A | 12/1995 | Florindez | 99/443 C |
| 5,542,345 A | 8/1996 | Gongwer | 99/345 |
| 5,740,722 A | 4/1998 | Emsens | 99/419 |
| 5,974,956 A | 11/1999 | McConnell | 99/421 H |

*Primary Examiner*—Reginald L. Alexander
(74) *Attorney, Agent, or Firm*—Gardner Groff & Mehrman, P.C.

(57) ABSTRACT

A frame having a first end and a second end and a plurality of discrete heating stations spaced along the frame between the first end and the second end. A plurality of spits are moved along the frame, each spit supporting a meat product thereon. An advancement and driving mechanism advances the spits from one dicrete heating station to the next in sequential fashion, and is operative to ensure that each spit resides within in the rotisserie for a pre-determined length of time to ensure that the meat is properly cooked, thereby avoiding undercooking and overcooking.

38 Claims, 9 Drawing Sheets

Fig. 1

STAGED ROTISSERIE

CROSS REFERENCE TO RELATED APPLICATIONS

This application is a CIP and claims the priority benefit of U.S. patent application Ser. No. 09/432,837, filed Nov. 1, 1999 issued as U.S. Pat. No. 6,202,545, on Mar. 20, 2001, which is a CIP of U.S. Pat. No. 5,974,956, issued on Nov. 2, 1999 both of which are hereby incorporated by reference in their entirety.

TECHNICAL FIELD

The present invention relates generally to commercial cooking apparatus and, in particular relates to a staged rotisserie for cooking meat products, such as poultry.

BACKGROUND OF THE INVENTION

In the general field of industrial cooking and baking, numerous processes and techniques are employed. For example, it is known to process some products using batch cooking operations in which a number of products are placed in an oven, cooked for a time, and then removed, after which a subsequent batch of products is placed in the oven for cooking and the process repeats.

It is also known in industrial food processing and cooking to process foods as they are moved along a conveyor line in a rather continuous fashion. For example, cookies are often cooked this way by placing raw cookie dough on a conveyor and conveying the cookie dough through an oven chamber at a predetermined speed to have the cookie dough resident in the oven chamber for a predetermined length of time in order to bake the cookies adequately. This results in baked cookies exiting the downstream end of the oven ready for packaging.

In the processed meat trade, there is known U.S. Pat. No. 4,644,857 to Buller-Colthurst, which relates to a food processing chamber and technique for the processing of meat and poultry products. The '857 patent describes a process chamber that is operated in a batch mode such that a batch of products can be introduced into a zone and then simply left stationary during its processing time in that zone. Once that time is up, the batch then can be moved to the next zone and simply left to stand in the next zone, and so on. The '857 patent further describes that in order to move batches or units of products through the zones, a step-wise or batch conveyor system is provided.

In the common manner of cooking chicken or other poultry in a restaurant, a rotisserie is used in which poultry are placed on skewers or spits, and the spits are placed within a small oven. The individual spits are rotated about their axis and the group of spits revolve around a central axis to provide even cooking of all of the poultry in the rotisserie. Such a system is shown generally in U.S. Pat. No. 5,471,915 to Lopata. Unfortunately, such a system generally fails to control the residence time of each individual poultry item. Indeed, unless all the poultry items are placed in the rotisserie at the same time and later removed all at once, some poultry items can be cooked for too long, other poultry items can be cooked just the right length of time, while still other poultry items can be cooked not long enough. This is very important inasmuch as even slight undercooking of poultry can pose a serious health risk to consumers by virtue of a failure to completely kill all bacteria that might be present on or in the poultry. Moreover, even slight overcooking of the poultry is highly undesirable as it tends to make the poultry rather tough and dry, because poultry tends to be particularly sensitive to overcooking.

Accordingly, it can be seen that a need yet remains for a rotisserie for cooking food items such as poultry, which rotisserie ensures precise control over the cooking of the meat therein to ensure proper doneness of the meat. It is to the provision of such a rotisserie that the present invention is primarily directed.

SUMMARY OF THE INVENTION

Briefly described, the present invention comprises a staged rotisserie for the controlled cooking of meat, such as poultry. The novel staged rotisserie includes a frame or a housing having an inlet end and an outlet end and has a plurality of discrete heating stations arranged sequentially from the inlet end to the outlet end. The staged rotisserie further includes a number of spits for supporting meat products mounted thereon and support means for supporting the spits in the plurality of discrete heating stations. Further, driving means are provided for driving the spits in rotation and advancement means are provided for periodically advancing the spits from one of the discrete heating stations to a sequentially next one of the discrete heating stations.

As spits move toward the outlet end, the spits can be continuously rotated by the driving means. Also, the driving means can be in the form of an endless drive chain driven continuously and engaging sprockets mounted on the spits. Additionally, the staged rotisserie includes an inlet control means for controlling admission of the spits adjacent the inlet end of the housing and being operative to admit a leading spit from a queue of spits adjacent the inlet end. The inlet control means can be activated by operation of the advancement means so that as the spits are advanced, another spit can be admitted through the inlet end.

The progression of the spits through the plurality of discrete heating stations can be in a generally descending manner. The advancement means can be operable to lift the spits from a lowered cooking position to a raised advancement position from which the spits can descend by gravity to the next sequential discrete heating station. The advancement means can take the form of a series of lifters, each being operative for lifting a spit, and a cam bar for raising and lowering the lifters. Also, guides can be positioned at each of the discrete heating stations to guide movement of the spits from the lowered cooking position to the raised advancement position.

In an alternative form, a walking beam assembly is utilized to advance the spits to the next sequential position, wherein a walking beam on each side of the staged rotisserie is driven in a generally rotational direction. A series of spit rests are carried along the longitudinal length of each walking beam for lifting the ends of each spit, wherein the spits travel in a generally circular direction to the next cooking position. The walking beam assembly can be driven by a motor and a series of pivot arms. Alternatively, the walking beam assembly can be driven by a vertical and a horizontal pneumatic cylinder. As an additional alternative means, a motor driven sprocket chained linked to another sprocket and coupled to crank arms are utilized to drive the walking beam assembly. As a further alternative means, the walking beam assembly can be driven by a set of motor driven links and crank arms. These alternative means for advancing the spits allows the present invention to be utilized on almost any degree of inclination.

The invention just described has numerous advantages. For example, the invention eliminates the requirement of an operator to monitor the time that a bird spends in a cooking apparatus or to monitor the internal temperature of the meat. In this way, human error is avoided. Moreover, the invention provides an extremely uniformly cooked product and does so at relatively high volumes (large numbers of poultry can be cooked in this way). The staged rotisserie apparatus also takes up a relatively small amount of space relative to its output of poultry. The staged rotisserie has the ability to vary the cooking temperature at various stages of cooking to effect optimum cooking results. Also, the staged rotisserie is designed to minimize cooking flare-ups and preferably includes side windows and top windows to allow operators and customers to view the cooking birds directly to verify the quality of the cooking period. Importantly, by eliminating the human element in timing the cooking operation or in monitoring an internal cooking temperature in the meat, overcooked and undercooked chicken can be virtually eliminated. The apparatus, because it requires less monitoring, also increases throughput while reducing the number of personnel required to operate the equipment.

Accordingly, it is an object of the present invention to provide a rotisserie which reliably cooks poultry to a precise degree of doneness.

It is another object of the present invention to provide a rotisserie which eliminates the need to have an operator monitor how long the item is being cooked or the final temperature of the item being cooked.

It is another object of the present invention to provide a rotisserie which allows the cooking temperature at various stages of cooking to be varied.

It is another object of the present invention to provide a rotisserie which minimizes flame flare-ups.

It is another object of the present invention to provide a rotisserie which is capable of producing extremely high volumes of uniformly cooked poultry.

It is another object of the present invention to provide a poultry rotisserie requiring a minimum amount of floor space.

It is another object of the present invention to provide a rotisserie which allows the customer or operator to visually observe the entirety of the cooking operations.

It is another object of the present invention to provide a staged rotisserie that can be utilized on level, inclined or declined surfaces.

It is yet a further object of the present invention to provide a staged rotisserie which is simple in its construction, economical to manufacture, and straight forward in use.

These and other objects, features and advantages of the present invention will become more apparent to those skilled in the art upon reading the following specification in conjunction with the accompanying drawing figures.

BRIEF DESCRIPTION OF THE DRAWING FIGURES

FIG. 3 is perspective view of a staged rotisserie according to an alternative form of the invention.

FIG. 7 is a side elevation view of a first alternative drive mechanism for the walking beam assembly of FIG. 3.

DETAILED DESCRIPTION OF EMBODIMENTS

Figure 1:
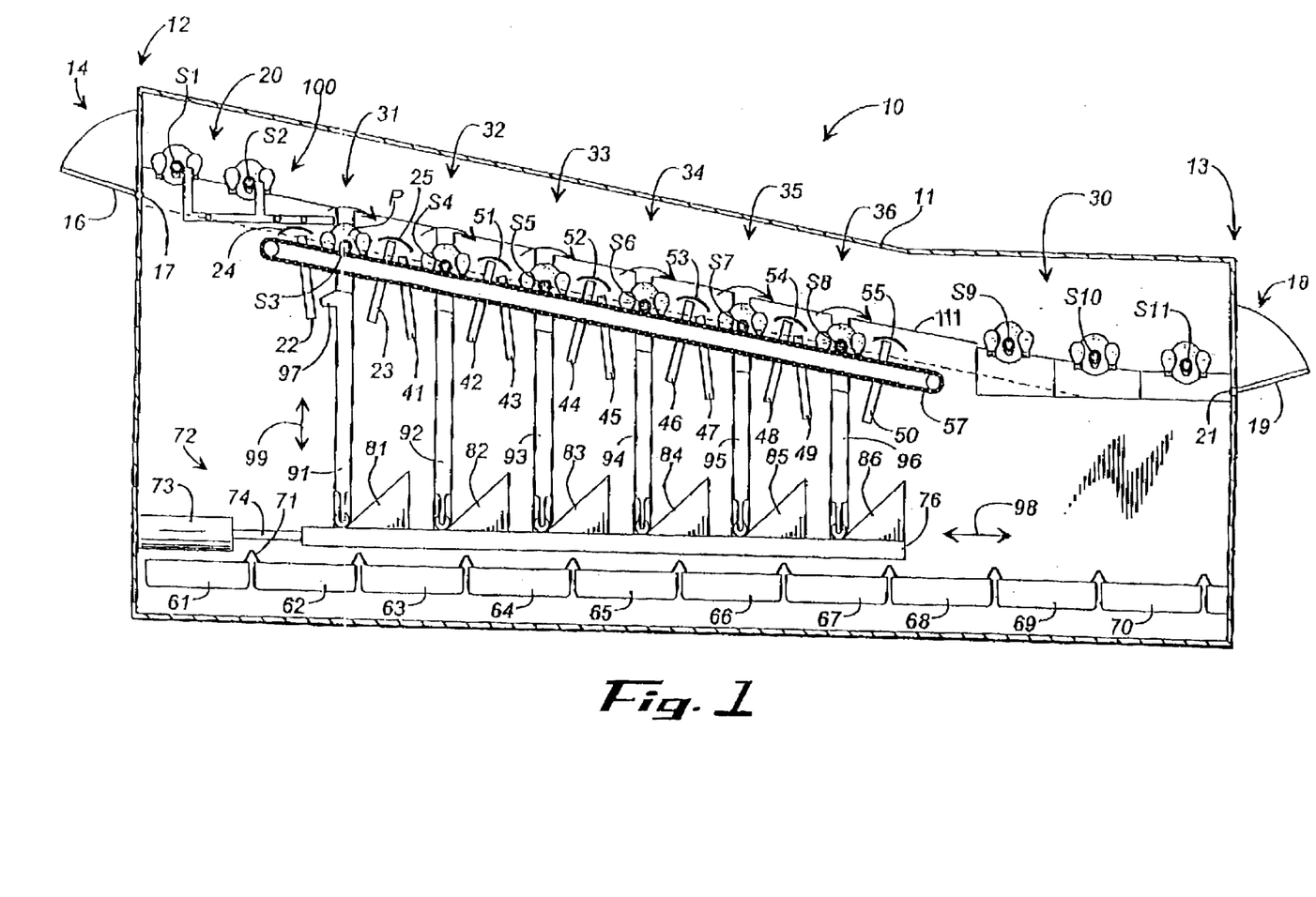
FIG. 1 is a side view of a staged rotisserie according to the present invention.

Referring now in detail to the drawing figures, wherein like reference numerals represent like parts throughout the several views, FIG. 1 shows a staged rotisserie apparatus 10 according to a preferred form of the invention. The staged rotisserie apparatus 10 includes a housing 11 having an inlet end 12 and an outlet end 13 opposite thereto. The housing also includes an inlet 14 covered by an inlet door 16 generally adjacent the inlet end 12 of the housing. The inlet door 16 is pivotally mounted to the housing 11 at a hinge 17. In this way, the inlet door 16 can be moved between a lowered position for admitting spits manually through the door and a raised position for closing off the inlet end of the housing. Adjacent the outlet end 13 of the housing 11, a similar outlet 18 is defined including an outlet door 19 pivotally mounted to the outlet end 13 of the housing 11 by a hinge 21.

The housing 11 is a compact unit that preferably includes viewing windows (not shown) in the sides and/or in the top for allowing an operator or a customer to view the cooking of poultry within the housing. While a totally enclosed housing with sides and a top is depicted in the drawings, in some instances it may be desirable to eliminate or remove one or more of the sides or the top to provide better visibility and improved access. It is pointed out that the invention has ready application in restaurants serving poultry and that it has additional application in factories preparing prepared (pre-cooked) poultry.

Within the housing 11, the poultry are maintained on spits or skewers S1–S8 (referred to collectively as "S") and are moved from the inlet end 12 toward the outlet end 13. The housing contains mechanisms for heating the poultry in individual heating stations, for rotating the poultry in the heating stations by rotating the spits, and for advancing the spits containing the poultry from one station to the next in sequential fashion. The housing also includes an inlet staging area 20 for containing a queue of poultry spits waiting to be passed to a first cooking station or stage and a warming output station 30 where fully cooked poultry is held in a warm condition until it is retrieved through the outlet door 19.

Still referring to FIG. 1, it can be seen that the housing 11 contains six (6) discrete heating stages or stations for cooking poultry on spits. While six such discrete cooking stages or stations are depicted in the drawing figures, those skilled in the art will recognize that fewer or greater numbers of heating stages can be suitably employed. Also, by making the cooking stages discrete from one another, they can be individually controlled to expose the poultry to different temperatures at different points during the cooking process. Each cooking station or stage can accommodate one spit S having one or more poultry P mounted thereon. For example, the first cooking stage 31 houses a spit S3 having mounted thereon poultry P. The other cooking stations 32–36 are similar. Each cooking station includes a pair of burners or heating elements, such as heating elements 22 and 23 associated with the first cooking station 31. Those skilled in the art will recognize that the cooking stations can include briquettes to provide even heating. The heating elements are positioned on either side of the poultry and face the poultry at a slight angle relative to vertical. In this way, the heating elements provide a generally uniform distribution of heat against the sides and bottom of the poultry. As the poultry rotates, all of the surface of the poultry is heated evenly and effectively. The bottom of the heating elements are kept from beneath the poultry so that drippings do not fall onto the heating elements, thereby avoiding flame flare-ups within the rotisserie. Also, the tops of the heating elements are shrouded by covers, such as covers 24 and 25, to prevent drippings from falling onto the heating elements as the poultry and the spits are moved from one cooking station to a sequential cooking station. The other cooking stations 32–36 are similarly arranged with pairs of heating elements and covers for the heating elements (the covers may each cover two heating elements, as shown). Thus, the apparatus 10 includes heating elements 41–50 and covers 51–55.

As the individual spits S are held within the discrete heating stations or cooking stations 31–36, the spits are continuously rotated by an endless chain 57 driven by an electric motor (not shown). The endless chain 57 engages sprockets mounted on the spits. In this way, as chain 57 is driven in rotation by the motor, all of the spits resting atop the endless chain 57 are rotated accordingly.

In a lower portion of the housing 11, a series of drip pans 61–70 are arranged. Each of the drip pans extends across the width of the housing beneath the various cooking stations, the inlet staging area, and the outlet staging area. These drip pans collect drippings from the poultry to allow the drippings to be collected and removed. The drip pans are placed side-by-side and the space between the drip pans is protected by inverted V-shaped diverters, such as diverter 71. A cam mechanism generally indicated at 72 is positioned above the drip pans 61–70 for raising and lowering the spits. The cam mechanism 72 includes a hydraulic or pneumatic cylinder 73 driving a pushrod 74 for pushing and pulling a cam bank 76. Mounted to the cam bank 76 are a series of identical cams 81–86.

Each of the cams 81–86 engages a cam roller mounted at the bottom end of a cam follower or lifter 91–96. Each of the lifters 91–96 has an upper end which engages one of the spits when the lifter is raised by operation of the cam block 76. The upper end or tip of the lifters 91–96 is slightly inclined to match the angle of incline of the endless chain 57. The upper end 97 of lifter 91 is different from the upper end of the other lifters and includes a portion residing beyond the guides and which is generally flag-shaped for cooperating with an inlet control mechanism for triggering the admission of one additional spit into the first cooking station. As shown in the figure, the lifters 91–96 are guided by guide surfaces such that back and forth motion of the cam block 76 (and therefore of the cams 81–86) in the lateral direction of direction arrow 98 is translated into simultaneous vertical up and down motion of the lifters 91–96 in the direction of direction arrow 99.

Figure 1A:
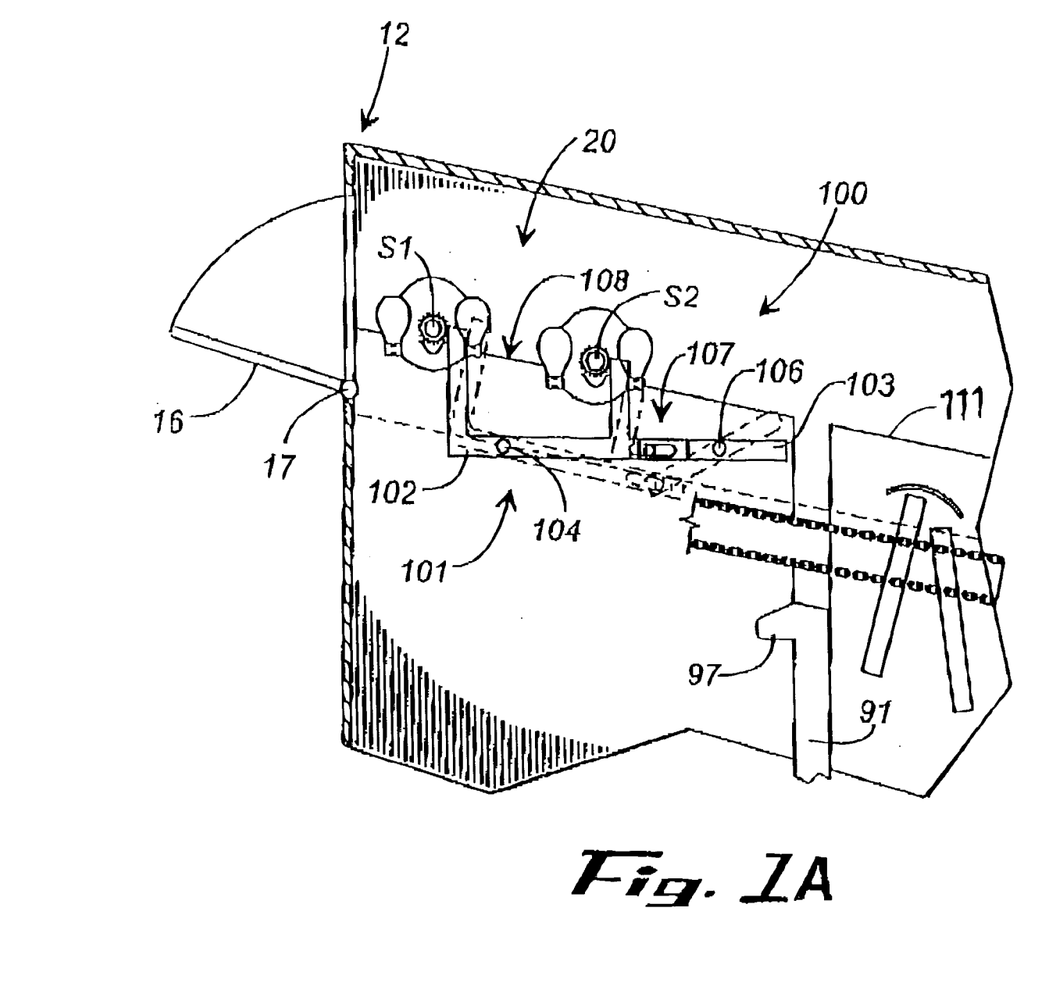
FIG. 1A is a detailed view of the inlet staging area of the staged rotisserie of FIG. 1.

Both FIG. 1 and FIG. 1A show the inlet control mechanism 100, with FIG. 1A showing it in more detail. As shown in FIG. 1A, the inlet control mechanism comprises a generally F-shaped linkage mechanism 101. The F-shaped linkage mechanism includes a short F-shaped link 102 and a pivot link 103. The F-shaped link 102 pivots about a pivot axle 104, while the pivot link 103 pivots about a pivot axle 106. Two links are coupled to each other by a pin and slot arrangement 107, with the slot being formed in the bottom leg portion of the F-shaped link 102, and the pin being attached to the end of pivot link 103. In this way, motion of the pivot link 103 from its blocking position (shown in solid line) to its admission position (shown in shadow line in FIG. 1A) causes the F-shaped link to pivot in a clockwise direction about pivot axle 104 to assume the position shown in shadow in FIG. 1A. Thus, the right-most tine of the F-shaped link 102 (as seen from the view in FIG. 1A) dips below the ramp surface 108 and allows a spit S2 to be admitted past the F-shaped link 102 and to roll or slide down the ramp 108 and fall into the slot of the first cooking station. While the right-most tine allows spit S2 to advance, the other tine of the F-shaped link 102 continues to hold spit S1 in position.

To allow spit S1 to advance to the position of S2 in FIG. 1A, the F-shaped link is rotated in the opposite (counter-clockwise) direction by an unshown portion of the cam mechanism.

Figure 2:
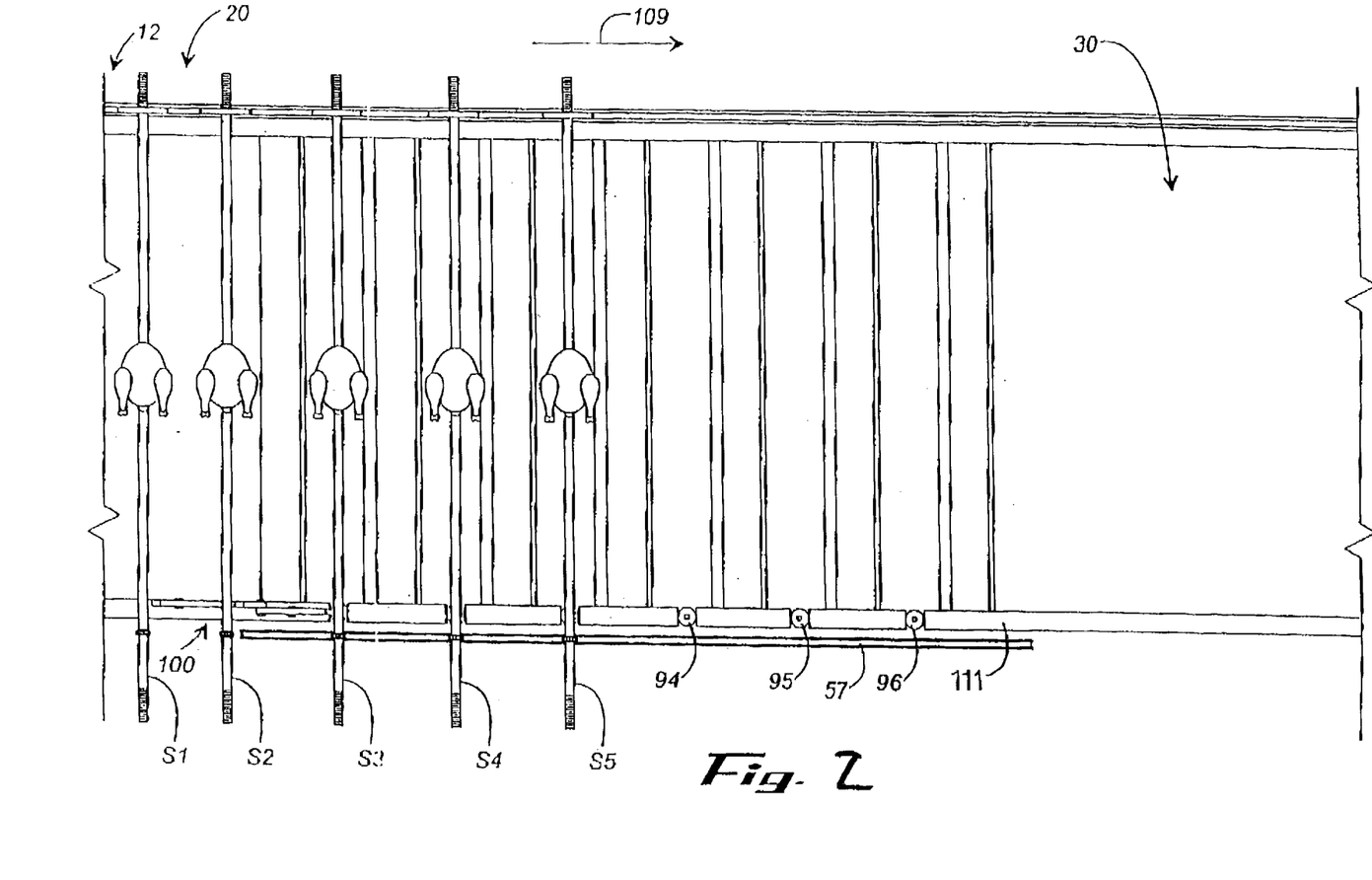
FIG. 2 is a top view of the interior of the staged rotisserie of FIG. 1.
Figure 4:
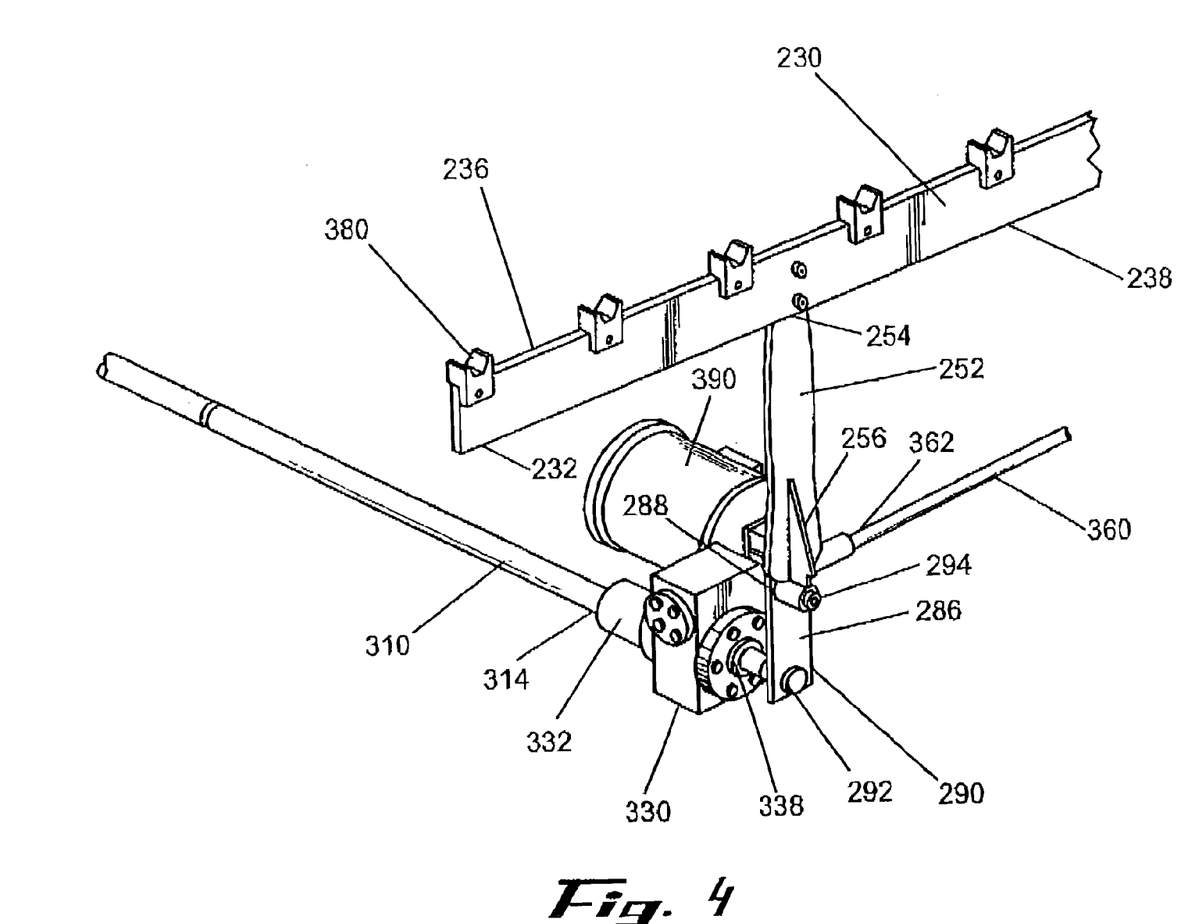
FIG. 4 is a detailed perspective view of the third walking beam assembly of FIG. 3.
Figure 5:
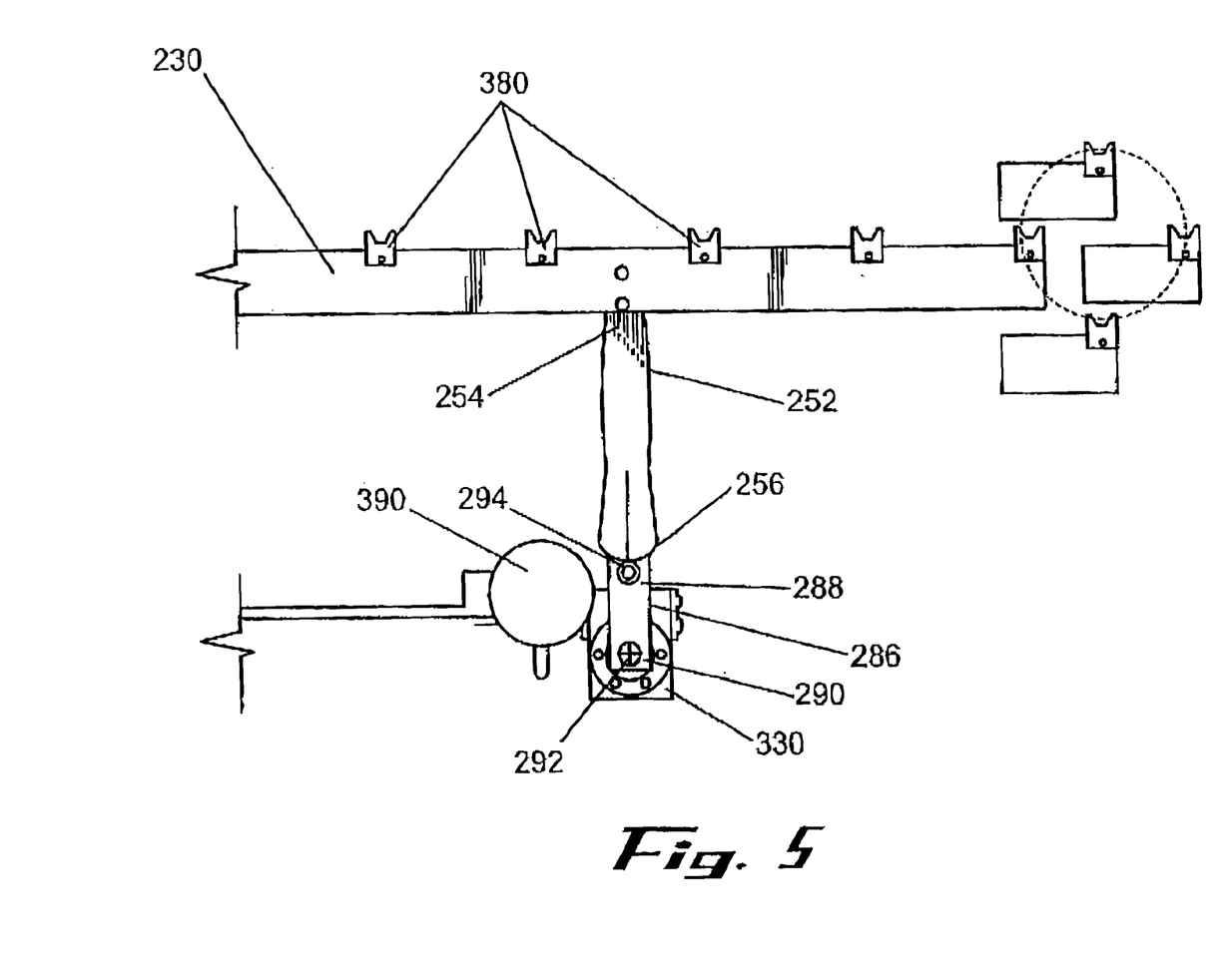
FIG. 5 is a side elevation view of the third walking beam assembly of FIG. 3.
Figure 6:
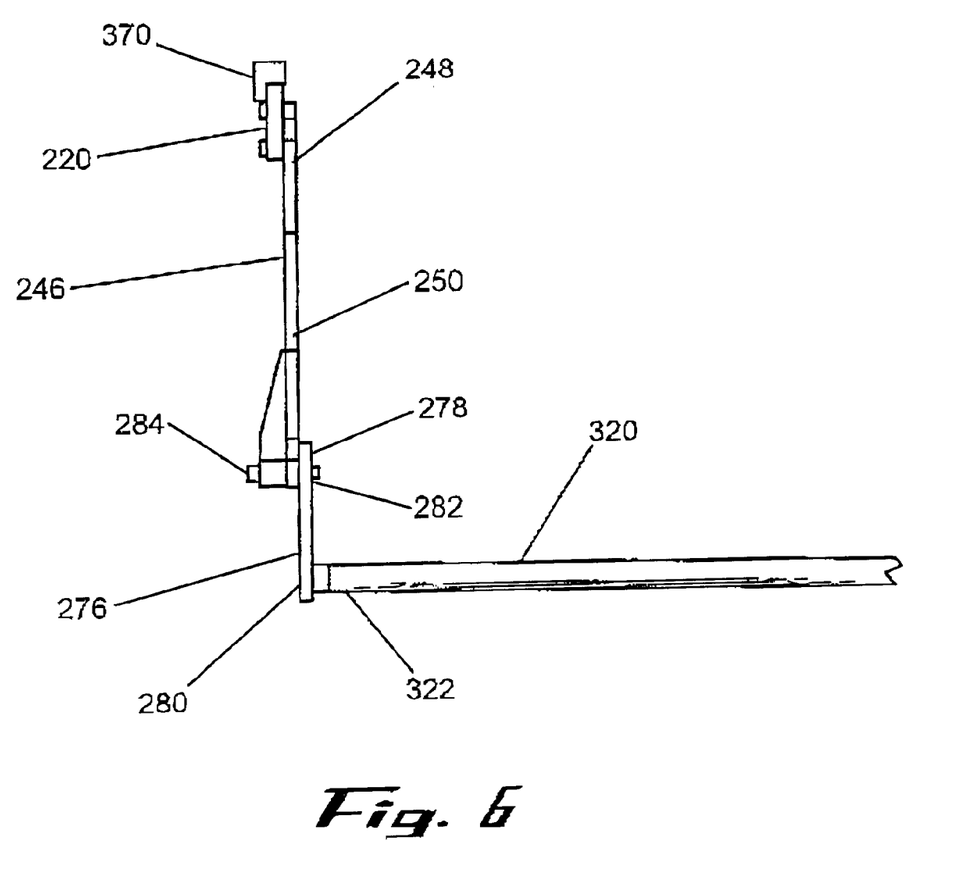
FIG. 6 is a side elevation view of the second walking beam assembly of FIG. 3.

FIG. 2 shows the internal workings of the staged rotisserie of FIG. 1, shown from inside the housing and looking down from above. FIG. 2 shows the progression of spits having poultry P mounted thereon from the inlet staging area 20 to the outlet staging area 30 in the direction of direction arrow 109. In particular, FIG. 2 shows the startup of cooking operations and shows a first spit S5 which has progressed about half-way through the staged rotisserie and is in the third cooking station. The first spit S5 is followed by second and third spits S4 and S3 that are in the second and first cooking stations, respectively. The next spit that would be introduced into the first cooking station would be spit S2, currently held in the inlet staging area 20. That would be followed by fifth spit S1, and so on. As the spits, such as spits S3–S5, are positioned and held in the individual discrete cooking stations, they are rotated continuously by operation of the endless chain 57.

To move the spits from one discrete cooking station to the next, the push rod 74 is retracted by the cylinder 73 to pull all of the cams 81–86 toward the cylinder 73. This has the effect of raising the individual lifters 91–96. The top surfaces of the lifters 91–96 engage the underside of the spits, thereby raising the spits with them. Once the spits have cleared the top surface of the inclined ramp 111 (see FIG. 1), they roll downwardly along the ramp 111 toward the next discrete cooking station. The cylinder 73 is then operated to extend the push rod 74, thereby lowering the lifters 91–96. Therefore, when each spit reaches the next cooking station, the spit drops into the slot between the guides and the sprockets on the spits once again are engaged by the endless chain 57. During this lifting of the spits, the flag-shaped end 97 of the first lifter engages the pivot link 103 of the inlet control mechanism to trigger the inlet control mechanism to admit one more spit. This spit takes the place of the spit that has evacuated from the first cooking station. In this way, the spits are held in a cooking station for a controlled length of time and then are advanced to a sequential next one of the cooking stations and sequenced through the discrete cooking stations from the inlet end toward the outlet end of the staged rotisserie.

Alternatively, rather than lifting the spits off of the endless drive chain 57, the endless drive chain 57 can be lifted by the lifters, thereby taking the spits upwardly as well. Once the spits breach the upper surface of the ramp, they all begin to roll downwardly down the ramp toward the next cooking station, whereupon the drive chain 57 is lowered once again by the cam mechanism.

It should be noted that the gravitationally assisted cam mechanism as described above is but one mechanism for advancing the spits S. An alternative embodiment such as that shown in FIGS. 3–6 can be provided wherein the spits S can be advanced without the need for a declined ramp. Referring now to FIG. 3, advancing mechanism 210 is a walking-beam apparatus for advancing the spits S being cooked to the next position in a staged rotisserie cooking machine. Advancing mechanism 210 generally comprises a first walking beam 220, a second walking beam 230, a first walking beam support 240, a second walking beam support 246, a third walking beam support 252, a fourth walking beam support 258, a first crank arm 266, a second crank arm 276, a third crank arm 286, a fourth crank arm 296, a first cross-shaft 310, a second cross-shaft 320, a first gearbox 330, a second gearbox 340, a propeller shaft 360, a first series of spit rests 370, a second series of spit rests 380 and a motor 390.

More specifically, the first walking beam 220 and the second walking beam 230 are preferably elongated and rectangular shape, wherein each has a first end 222 and 232, respectively, a second end 224 and 234, respectively, a first longitudinal edge 226 and 236, respectively, and a second longitudinal edge 228 and 238, respectively. The first walking beam support 240 has a first end 242 and a second end 244, wherein the first end 242 is rigidly attached proximal to the first end 222 of the first walking beam 220 via bolts or any other known attaching means, and wherein the second end 244 is pivotably attached to a first end 268 of the first crank arm 266 via a first half-wing bolt 274 or any other known pivotable attaching means.

The second walking beam support 246 has a first end 248 and a second end 250, wherein the first end 248 is rigidly attached proximal to the second end 224 of the first walking beam 220 via bolts or any other known attaching means, and wherein the second end 250 is pivotably attached to a first end 278 of the second crank arm 276 via a second half-wing bolt 284 or any other known pivotable attaching means.

The third walking beam support 252 has a first end 254 and a second end 256, wherein the first end 254 is rigidly attached proximal to the first end 232 of the second walking beam 230 via bolts or any other known attaching means, and wherein the second end 256 is pivotably attached to a first end 288 of the third crank arm 286 via a third half-wing bolt 294 or any other known pivotable attaching means.

The fourth walking beam support 258 has a first end 260 and a second end 262, wherein the first end 260 is rigidly attached proximal to the second end 234 of the second walking beam 230 via bolts or any other known attaching means, and wherein the second end 262 is pivotably attached to a first end 298 of the fourth crank arm 296 via a fourth half-wing bolt 304 or any other known pivotable attaching means.

The first crank arm 266 has a throughhole 272 formed proximal to a second end 270 thereof, wherein the throughhole 272 is dimensioned for receiving a first end 312 of the first cross-shaft 310. The second crank arm 276 has a throughhole 282 formed proximal to a second end 280 thereof, wherein the throughhole 282 is dimensioned for receiving a first end 322 of the second cross-shaft 320. The third crank arm 286 has a throughhole 292 formed proximal to a second end 290 thereof, wherein the throughhole 292 is dimensioned for receiving a first mini-shaft 338. The fourth crank arm 296 has a throughhole 302 formed proximal to a second end 300 thereof, wherein the throughhole 302 is dimensioned for receiving a second mini-shaft 348.

A second end 314 of cross-shaft 310 is secured to the first gearbox 330 via coupling 332. On the opposing side of the first gearbox 330 extends the first mini-shaft 338. The rotational output of the motor 390 is attached to and in mechanical communication with the first gearbox 330 such that the first gearbox 330 reduces the rotational speed of the motor 390 output and transfers this reduced rotational speed to the first cross-shaft 310 and the first mini-shaft 338. The first cross-shaft 310 and the first mini-shaft 338 rotate the first crank arm 266 and the third crank arm 286, respectively. It should be noted that one skilled in the art, given the rotational output speed of the motor 390 and the desired rotational speed of the first crank arm 266 and the third crank arm 286, would be able to select a gearbox having the desired rotational speed reduction.

The rotational output of the motor 390 is additionally attached to and in mechanical communication with the second gearbox 340 via the propeller shaft 360, wherein a first end 362 of propeller shaft 360 is attached to the motor 390 output and a second end 364 of propeller shaft 360 is attached to the second gearbox 340. The second gearbox 340 reduces the rotational speed of the motor 390 output and transfers this reduced rotational speed to the second cross-shaft 320 and the second mini-shaft 348. The second cross-shaft 320 and the second mini-shaft 348 rotate the second crank arm 276 and the fourth crank arm 296, respectively. It should be noted that one skilled in the art, given the rotational output speed of the motor 390 and the desired rotational speed of the second crank arm 276 and the fourth crank arm 296, would be able to select a gearbox having the desired rotational speed reduction.

A first series of spit rests 370 is attached to and evenly spaced apart on the first longitudinal edge 226 of the first walking beam 220 via bolts or any other attaching means. Each spit rest 370 is shaped and dimensioned for receiving an end of one of the spits. A second series of spit rests 380 is attached to the first longitudinal edge 236 of the second walking beam 230 via bolts or any other attaching means. Each spit rest 380 is shaped and dimensioned for receiving the other end of one of the spits.

In use, when the motor 390 is powered, a rotational output is thereby generated, wherein said rotational output is mechanically transferred directly to the first gearbox 330 and indirectly to the second gearbox 340 via the propeller shaft 360. First gearbox 330 and second gearbox 340 can reduce the rotational speed of the motor 390 to the speed desired for a particular application. The reduced rotational speed of the first gearbox 330 is transferred directly to the first cross-shaft 310 and the first mini-shaft 338. The first cross-shaft 310 is rigidly attached to the first crank arm 266 and thus rotates the first crank arm 266, wherein the first crank arm 266 is pivotably attached to the first walking-beam support 240, and wherein the first walking-beam support 240 is attached to the first end 222 of the first walking beam 220. As such, the first end 222 of the first walking beam 220 is rotated in a circular motion. The first mini-shaft 338 is rigidly attached to the third crank arm 286 thereby causing the third crank arm 286 to rotate which in turn rotates the pivotably attached third walking-beam support 252 and thus, the first end 232 of the second walking beam 230 in a circular motion.

The second ends 224 and 234 of the first walking beam 220 and the second walking beam 230, respectively, are synchronously rotated with the first ends 222 and 232 of the first walking beam 220 and the second walking beam 230, respectively, via the output of the second gearbox 340. The reduced rotational speed of the second gearbox 340 is transferred directly to the second cross-shaft 320 and the second minishaft 348. The second cross-shaft 320 is rigidly attached to the second crank arm 276 and thus rotates the second crank arm 276, wherein the second crank arm 276 is pivotably attached to the second walking-beam support 246, and wherein the second walking-beam support 246 is attached to the second end 224 of the first walking beam 220. As such, the second end 224 of the first walking beam 220 is rotated in a circular motion. The second mini-shaft 348 is rigidly attached to the fourth crank arm 296 thereby causing the fourth crank arm 296 to rotate, which in turn rotates the pivotably attached fourth walking-beam support 258 and thus, the second end 234 of the second walking beam 230 in a circular motion.

Consequently, as walking beams 220 and 230 are rotated, the spit rests 370 and 380 lift the spits from a cooking position and advance them in a generally circular motion to the next cooking position. Walking beams 220 and 230 are continued in a generally circular motion and thus returned to their initial position wherein the spit rests 370 and 380 lift the spits and advance them to the next position.

Figure 8:
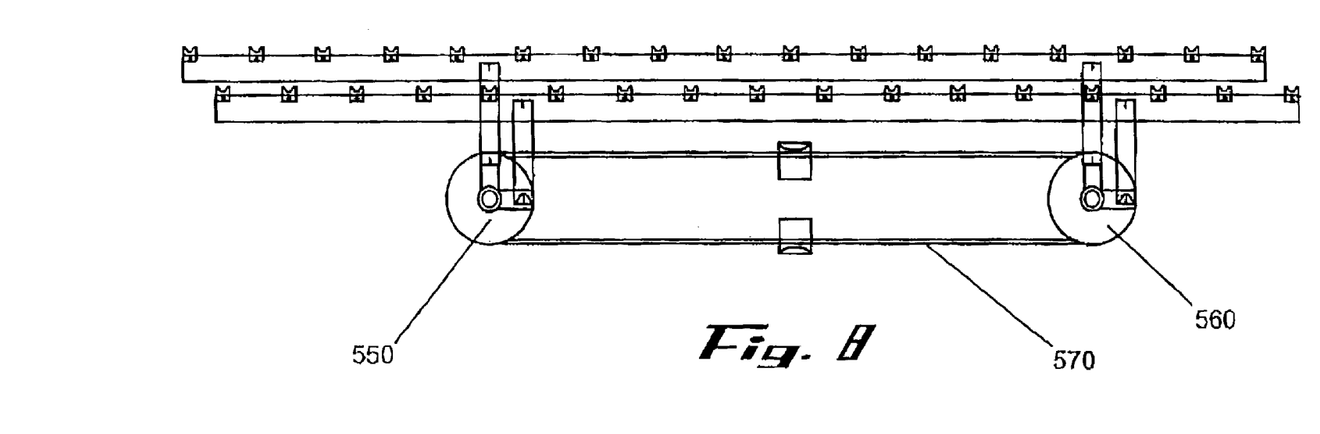
FIG. 8 is a side elevation view of a second alternative drive mechanism for the walking beam assembly of FIG. 3.
Figure 9:
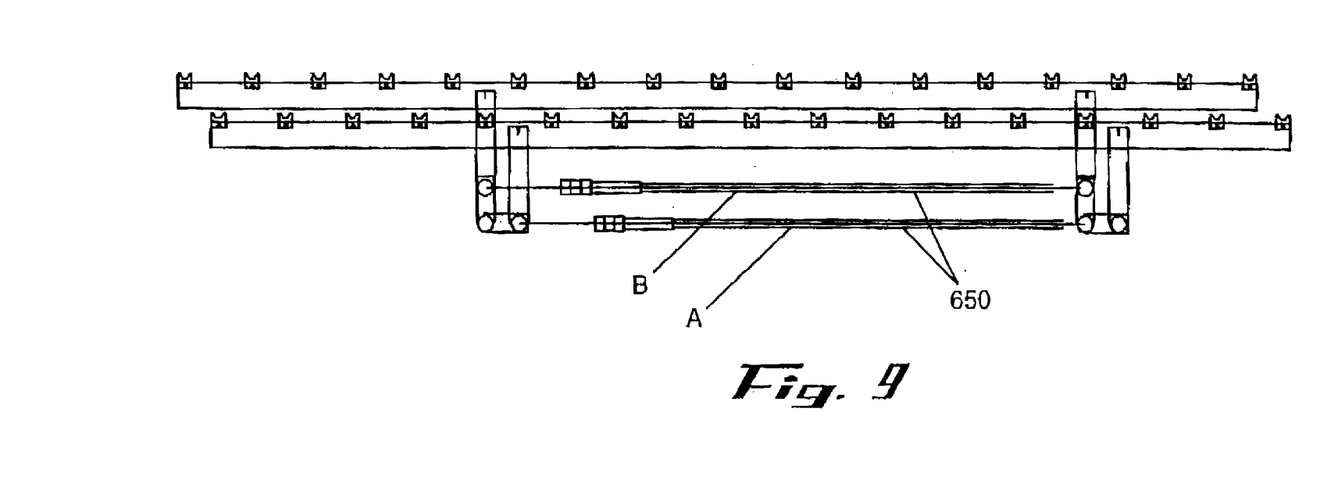
FIG. 9 is a side elevation view of a third alternative drive mechanism for the walking beam assembly of FIG. 3.

First, second, and third alternate means for driving walking beams 220 and 230 are contemplated as shown in FIGS. 7–9, respectively. For instance, FIG. 7 shows a pneumatic means wherein a vertically positioned pneumatic piston 460 and a horizontally positioned pneumatic piston 450 are provided. The vertically positioned pneumatic piston 460 provides vertical movement while the horizontally positioned pneumatic piston 450 provides horizontal movement, wherein the pistons work together to create a generally circular movement pattern. In FIG. 8, a drive means is shown that utilizes spaced-apart sprockets 550 and 560 mechanically linked by a chain 570; other linking means such as, for exemplary purposes only, a cable or belt may be utilized. In FIG. 9, a first linking member 650 and a second (not shown) are utilized on each walking beam 220 and 230 to synchronize their movement. The linking member 650 is shown in a first position A and a second rotated position B.

While the invention has been shown in preferred forms, it will be apparent to those skilled in the art that many modifications, additions, and deletions can be made therein without departing from the spirit and scope of the invention as set forth in the following claims.

What is claimed is:

1. A staged rotisserie for continuous cooking of meat, comprising:
   a housing having an inlet and an outlet and having a plurality of discrete heating stations arranged sequentially from said inlet to said outlet;
   a plurality of spits for supporting meat products mounted thereon;
   support means for supporting said spits in said plurality of discrete heating stations;
   driving means for driving said spits in rotation; and
   advancement means for periodically advancing said spits from one of said discrete heating stations to a sequentially next one of said discrete heating stations generally in a descending direction.

2. The staged rotisserie as claimed in claim 1, wherein as said advancement means operates to advance said spits from one discrete heating station to the next, said spits are continuously rotated by said driving means.

3. The staged rotisserie as claimed in claim 1, wherein said driving means comprises an endless drive chain driven continuously and engaging sprockets mounted on said spits.

4. The staged rotisserie as claimed in claim 1, further comprising inlet control means for controlling admission of spits through said inlet of said housing.

5. The staged rotisserie as claimed in claim 4, wherein said inlet control means is operative to admit a leading spit from a queue of spits adjacent said inlet.

6. The staged rotisserie as claimed in claim 4, wherein said inlet control means is activated by operation of said advancement means so that as said spits are advanced, another spit can be admitted through said inlet.

7. The staged rotisserie as claimed in claim 1, wherein said advancement means is operative to lift spits from a lowered cooking position to a raised advancement position from which said spits are lowered to the next sequential discrete heating station.

8. The staged rotisserie as claimed in claim 7, wherein said advancement means comprises a plurality of lifters, each of said lifters being operative for lifting a spit, said advancement means further comprising a cam bar for raising and lowering said lifters.

9. The staged rotisserie as claimed in claim 8, further comprising guides positioned at each of said discrete heating stations to guide movement of said spits from said lowered cooking position to said raised advancement position.

10. A rotisserie for cooking meat, comprising:
    a housing having an inlet end and an outlet end;
    a plurality of spits each for supporting at least one meat product thereon;
    admission means for admitting spits having poultry mounted thereon into said housing;
    advancement and driving means for advancing said spits through said housing in sequential fashion and for driving said spits in rotation within said housing, said advancement and driving means being operative to ensure that each spit resides within said housing for a pre-determined length of time, wherein said advancement and driving means is operative to lift said spits from a lowered cooking position to a raised advancement position from which said spits are lowered to the next sequential discrete heating station; and
    heating elements positioned within said housing for heating meat supported on said spits.

11. The rotisserie as claimed in claim 10, wherein said admission means comprises means for admitting one spit at a time.

12. The rotisserie as claimed in claim 10, wherein said admission means comprises a movable door.

13. The rotisserie as claimed in claim 10, wherein said housing comprises a series of discrete heating stations and wherein said advancement and driving means is adapted for sequentially advancing said spits from one of said discrete heating stations to a next one of said discrete heating stations and through said housing.

14. The rotisserie as claimed in claim 10, wherein said advancement and driving means comprises a plurality of lifters, each of said lifters being operative for lifting a spit, said advancement and driving means further comprising a cam bar for raising and lowering said lifters.

15. The rotisserie as claimed in claim 14, further comprising guides positioned adjacent each of said discrete heating stations to guide movement of said spits from said lowered cooking position to said raised advancement position.

16. The rotisserie as claimed in claim 10, wherein said advancement and driving means is operative to trigger said admission means such that as spits are advanced from one discrete heating station to the next, said admission means is operated to admit one additional spit.

17. A staged rotisserie for continuous cooking of meat, comprising:

a frame having a first end and a second end, said frame having a plurality of discrete heating stations arranged sequentially from said first end to said second end;

a plurality of spits for supporting meat products mounted thereon;

support means for supporting said spits in said plurality of discrete heating stations; and advancing means for periodically advancing said spits from one of said discrete heating stations to a sequentially next one of said discrete heating stations, wherein said advancing means is a walking beam assembly.

18. The staged rotisserie as claimed in claim 17, wherein said walking beam assembly comprises a first walking beam spaced apart from and substantially parallel with a second walking beam, said first walking beam having a first end and a second end, said second walking beam having a first end and a second end, and wherein said first walking beam and said second walking beam are generally rotated by a driving means.

19. The staged rotisserie as claimed in claim 18, wherein said driving means comprises a motor, at least a first crank arm, and at least a second crank arm, said first crank arm attached to said first walking beam, said second crank arm attached to said second walking beam, and wherein said first crank arm and said second crank arm are in rotational communication with said motor.

20. The staged rotisserie as claimed in claim 18, wherein said driving means comprises a motor, a first crank arm attached to said first walking beam proximal to said first end, a second crank arm attached to said first walking beam proximal to said second end, a third crank arm attached to said second walking beam proximal to said first end, a fourth crank arm attached to said second walking beam proximal to said second end, and wherein said first crank arm, said second crank arm, said third crank arm, and said fourth crank arm are in rotational communication with said motor.

21. The staged rotisserie as claimed in claim 18, wherein said driving means comprises a horizontally positioned pneumatic piston and a vertically positioned pneumatic piston, and wherein said horizontally positioned pneumatic piston provides horizontal movement and said vertically positioned pneumatic piston provides vertical movement.

22. The staged rotisserie as claimed in claim 18, wherein said driving means comprises a motor, a first sprocket, a second sprocket, and a linking means for linking said first sprocket to said second sprocket, wherein said motor, said first sprocket, and said second sprocket are in mechanical communication.

23. The staged rotisserie as claimed in claim 22, wherein said linking means is a chain.

24. The staged rotisserie as claimed in claim 22, wherein said linking means is a belt.

25. A rotisserie for cooking meat, comprising:

a housing having an inlet end and an outlet end, wherein said housing comprises a series of discrete heating stations;

a plurality of spits each for supporting at least one meat product thereon;

admission means for admitting spits having meat mounted thereon into said housing, wherein said admission means comprises a movable door;

advancement and driving means for advancing said spits through said housing in sequential fashion and for driving said spits in rotation within said housing, said advancement and driving means being operative to ensure that each spit resides within said housing for a pre-determined length of time, said advancement and driving means adapted for sequentially advancing said spits from one of said discrete heating stations to a next one of said discrete heating stations and through said housing, and said advancement and driving means operative to lift said spits from a lowered cooking position to a raised advancement position from which said spits are lowered to said next discrete heating station; and heating elements positioned within said housing for heating meat supported on said spits.

26. The staged rotisserie as claimed in claim 25, further comprising guides positioned at each of said discrete heating stations to guide movement of said spits from said lowered cooking position to said raised advancement position.

27. The rotisserie as claimed in claim 25, wherein said admission means comprises means for admitting one spit at a time.

28. The rotisserie as claimed in claim 25, wherein said advancement and driving means comprises a plurality of lifters, each of said lifters being operative for lifting a spit, said advancement and driving means further comprising a cam bar for raising and lowering said lifters.

29. The rotisserie as claimed in claim 28, further comprising guides positioned adjacent each of said discrete heating stations to guide movement of said spits from said lowered cooking position to said raised advancement position.

30. The rotisserie as claimed in claim 25, wherein said advancement and driving means is operative to trigger said admission means such that as spits are advanced from one discrete heating station to the next, said admission means is operated to admit one additional spit.

31. A staged rotisserie for continuous cooking of meat, comprising:

a frame having a first end and a second end, said frame having a plurality of discrete heating stations arranged sequentially from said first end to said second end;

a plurality of spits for supporting meat products mounted thereon; and a walking beam assembly adapted to periodically advance said spits from one of said discrete heating stations to a sequentially next one of said discrete heating stations.

32. The staged rotisserie as claimed in claim 31, wherein said walking beam assembly comprises a first walking beam spaced apart from and substantially parallel with a second walking beam, said first walking beam having a first end and a second end, said second walking beam having a first end and a second end, and wherein said first walking beam and said second walking beam are generally rotated by a driving means.

33. The staged rotisserie as claimed in claim 32, wherein said driving means comprises a motor, at least a first crank arm, and at least a second crank arm, said first crank arm attached to said first walking beam, said second crank arm attached to said second walking beam, and wherein said first crank arm and said second crank arm are in rotational communication with said motor.

34. The staged rotisserie as claimed in claim 32, wherein said driving means comprises a motor, a first crank arm attached to said first walking beam proximal to said first end, a second crank arm attached to said first walking beam proximal to said second end, a third crank arm attached to said second walking beam proximal to said first end, a fourth crank arm attached to said second walking beam proximal to said second end, and wherein said first crank arm, said second crank arm, said third crank arm, and said fourth crank arm are in rotational communication with said motor.

35. The staged rotisserie as claimed in claim 32, wherein said driving means comprises a horizontally positioned pneumatic piston and a vertically positioned pneumatic piston, and wherein said horizontally positioned pneumatic piston provides horizontal movement and said vertically positioned pneumatic piston provides vertical movement.

36. The staged rotisserie as claimed in claim 32, wherein said driving means comprises a motor, a first sprocket, a second sprocket, and a linking means for linking said first sprocket to said second sprocket, wherein said motor, said first sprocket, and said second sprocket are in mechanical communication.

37. The staged rotisserie as claimed in claim 36, wherein said linking means is a chain.

38. The staged rotisserie as claimed in claim 36, wherein said linking means is a belt.

* * * * *

UNITED STATES PATENT AND TRADEMARK OFFICE
CERTIFICATE OF CORRECTION

PATENT NO.    : 6,526,877 B2
DATED         : March 4, 2003
INVENTOR(S)   : McConnell, James W.

It is certified that error appears in the above-identified patent and that said Letters Patent is hereby corrected as shown below:

<u>Title page,</u>
Item [57], ABSTRACT,
Line 6, the word "dicrete" should be spelled -- discrete --.

Delete drawing sheet 4 of 9 consisting of Fig. 3 and replace with the attached sheet consisting of Fig. 3 therefore.

Signed and Sealed this

Sixteenth Day of September, 2003

JAMES E. ROGAN
*Director of the United States Patent and Trademark Office*

Fig. 7